United States Patent [19]

Connolly et al.

[11] Patent Number: 4,545,231
[45] Date of Patent: Oct. 8, 1985

[54] METHOD OF MANUFACTURING A WELD NECK FLANGE

[75] Inventors: Walter L. Connolly, Moraga; Harold T. Ray, Walnut Creek, both of Calif.

[73] Assignee: Grove Valve & Regulator Company, Oakland, Calif.

[21] Appl. No.: 635,655

[22] Filed: Jul. 30, 1984

Related U.S. Application Data

[62] Division of Ser. No. 408,457, Aug. 16, 1982, abandoned.

[51] Int. Cl.[4] .............................................. B21D 28/02
[52] U.S. Cl. .......................................... 72/335; 72/325; 29/157.4; 29/157.1 R
[58] Field of Search .............................. 72/324–327, 72/335, 333, 332, 342, 379; 29/157.4, 157.1 R; 285/405, 363, 286

[56] References Cited

U.S. PATENT DOCUMENTS

| | | | |
|---|---|---|---|
| 580,845 | 4/1897 | Buxton | 72/335 |
| 2,058,064 | 10/1936 | Culbertson | 29/157.4 |
| 2,157,354 | 5/1939 | Sherman | 72/379 |
| 2,859,510 | 11/1958 | Baxa | 72/325 |
| 3,412,593 | 11/1968 | Price . | |
| 4,339,112 | 7/1982 | Connolly et al. | 251/367 |

FOREIGN PATENT DOCUMENTS

| | | | |
|---|---|---|---|
| 2754563 | 6/1978 | Fed. Rep. of Germany . | |
| 1198440 | 12/1959 | France | 29/157.4 |
| 349569 | 12/1960 | Switzerland | 29/157.4 |
| 2086786 | 5/1982 | United Kingdom | 72/324 |
| 268360 | 4/1970 | U.S.S.R. | 72/325 |

OTHER PUBLICATIONS

Timmerbeil, F. W., "Das Durchziehen von Kragen an Ebenen Blechen", from *Werkstattstechnik und Maschinenbau*, vol. 44, No. 5, May, 1954.

Lindberg, Roy A., *Processes and Materials of Manufacture*, Allyn and Bacon, Inc., Boston, Mass., Mar. 1969.

*Primary Examiner*—Daniel C. Crane
*Attorney, Agent, or Firm*—Melvin R. Stidham

[57] ABSTRACT

A pipe flange with a heavy welding neck which is hot formed from a circular section of steel plate having a small co-axial hole in the center.

The steel around the hole is shear-formed downward and outward by a tapered die plug which is forced through the small hole, forming an integral neck on the flange. A supporting ring die is radiused at its inner corner to form a suitable fillet radius at the junction of the neck with the flange proper. A suitable preforming or post-forming operation may be required to compensate for any deflection in the workpiece out of planar configuration.

2 Claims, 8 Drawing Figures

METHOD OF MANUFACTURING A WELD NECK FLANGE

RELATED APPLICATION

This application is a division of our co-pending application Ser. No. 408,457, filed Aug. 16, 1982, now abandoned for "Weld Neck Flange For A Valve Or The Like And Method of Manufacture."

BACKGROUND OF THE INVENTION

Pipeline components, such as valves, pumps, meters and the like are connected into the pipeline by means of pipe flanges, with gasket ring seals interposed between flange faces, where it is contemplated that the component may have to be separated for maintenance work, repairs or replacement. Weld neck flanges, which are commonly provided for such purposes are produced by the use of forging presses and suitable forging dies. These dies are rather expensive since they must be very heavy to contain the large forces which the hot steel forging exerts on the die, and the steels used in the dies are costly due to the alloy requirements needed to sustain the thermal shock involved in the operation.

Welding neck flanges, as produced in quantity for the piping trade, have tapered necks forged as a projection from the side of the flange opposite to the sealing gasket. This tapered neck has its outside diameter reduced at the point of welding to the pipeline to match the outside diameter of standard pipe sizes. Typically this would produce a flange neck wall thickness of $\frac{1}{4}''$ to $\frac{1}{2}''$ for the pipe sizes from 6" to 16" diameter. However, in valves and other pipeline pressure vessels, it is common to have body wall thicknesses of from $\frac{3}{4}''$ to $1\frac{1}{2}''$ for those same pipe sizes. When such pressure vessels have their bodies made as steel castings, they usually have integrally cast pipe flanges with suitably heavy flange necks. However, where such pressure vessels are manufactured from wrought steel components, they may have end closures of thick steel plate with heavy steel cylindrical hubs welded around flow openings therethrough. Weld neck flanges which are commonly available may not be suitable for welding to such closure hubs because of their thin wall tapered necks above described. However, the alternative of providing forged pipe flanges that have suitably heavy necks may not be economically feasible because the cost of special forging dies is very high, and the setup charges for the forging press are considerable. This can be a major manufacturing consideration, particularly with the great variety of flanges required, and such costs are usually unwarranted just to satisfy the relatively small demand for special flanges, as compared to the large market for standard flanges which are produced with tapered necks for welding to pipe.

Added to the cost burden of forged special flanges with heavy necks is the delivery delay which is usually encountered. Since the run is generally short, the forge shop will not find the job attractive and the delivery time obtainable for the forgings is normally not suited to the usual fabrication schedules for valves or similar products.

OBJECTS OF THE INVENTION

It is an object of this invention to provide a pipe flange with an integral, thick welding neck suitable for welding to a corresponding heavy wall of a body for a valve or other piping components.

It is a further object of this invention to provide a pipe flange with an integral welding neck which can be economically produced in relatively small lots, using inexpensive open dies and relatively low, hot-forming press forces.

It is a further object of this invention to provide a pipe flange with an integral welding neck in which the grain flow lines of the parent plate are drawn axially into the welding neck so as to provide maximum resistance to the service stresses.

Other objects and advantages of this invention will become apparent from the description to follow, particularly when read in conjunction with the accompanying drawings.

SUMMARY OF THE INVENTION

A circular steel workpiece with a small hole in its center is heated to glowing and then placed on an open die support ring, and a male die having a steep conical leading portion merging into a trailing cylindrical portion with an outside diameter approximately equal to the desired flow passage is forced through the center opening. The steep conical entry nose engages the edges of the workpiece adjacent to the small throughhole with a substantial vertical force vector that shearforms the hot metal immediately adjacent the edges of the through-opening to move the hot metal from that interior portion downward and outward, producing a welding neck on the lower surface of the blank. The workpiece may be pre-formed by forcing a blunt nosed punch against that surface from which the welding neck is to protrude to make it somewhat concave. This will compensate for any tendency of the metal outward of the center opening edges to be drawn out of the desired planar disposition.

DESCRIPTION OF PREFERRED EMBODIMENTS

Figure 1:
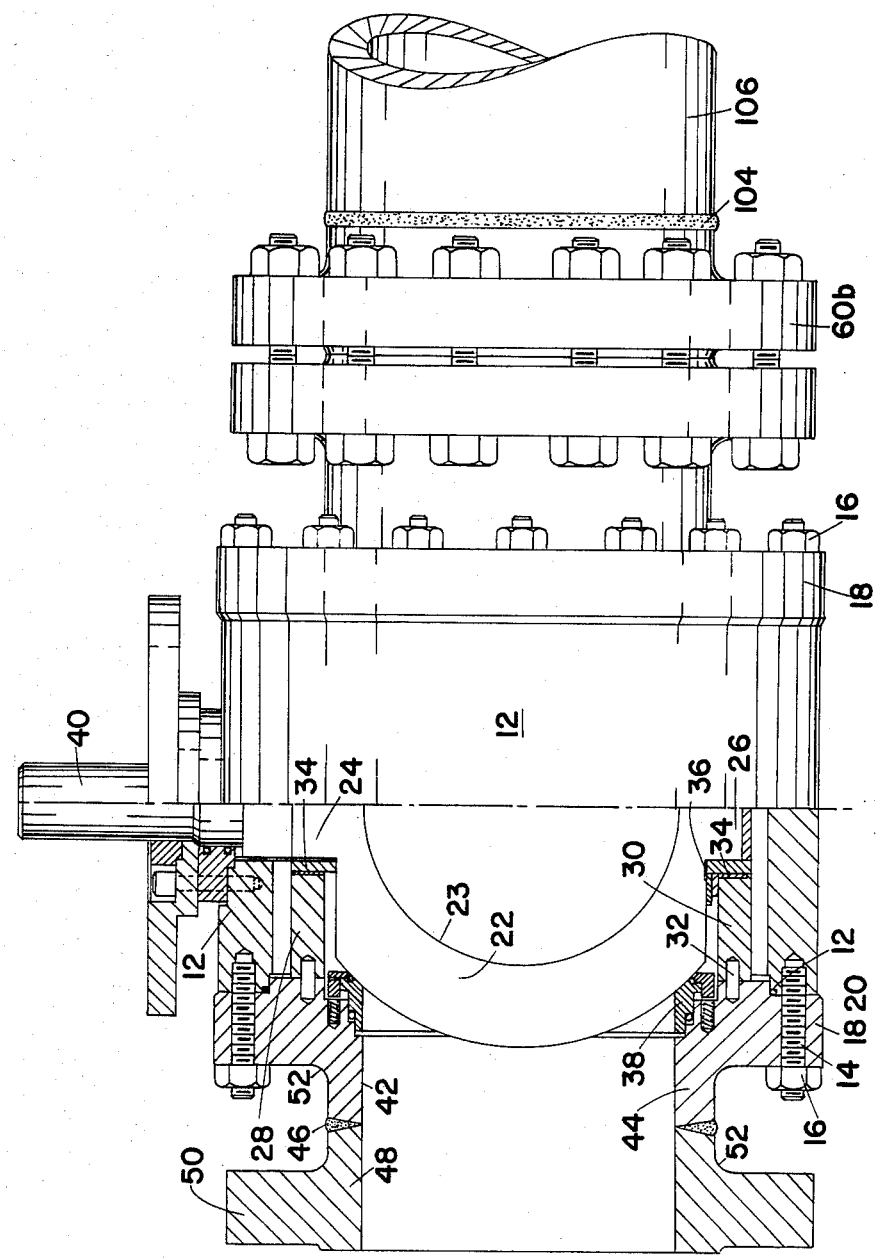
FIG. 1 is an elevation view partially in section of a valve structure with pipeline weld neck flanges manufactured in accordance with this invention.

Referring now more particularly to FIG. 1, there is shown a ball valve 10 which may, for example, include a tubular body band 12 rolled from plate material. Secured to the end faces of the body band 12, as by means of studs 14 and nuts 16, are end closures 18, and suitable seals, such as O-rings 20, seal between the end closures 18 and the tubular body band 12.

A valve ball 22 having a flow passage 23 therethrough, carries upper and lower trunnions 24 and 26, which are rotatably mounted in upper and lower bearing blocks 28 and 30. The bearing blocks are positioned in the body 12 by engagement of dowel pins 32 in the end closures 18, and they are secured in place by being clamped between the end closures 18 when the nuts 16 are tightened. Suitable bushings 34 are provided in the bearing blocks 28 and 30 and a thrust bearing 36 is carried on the lower bearing block 30, all to facilitate rotation of the ball 22.

Suitable main valve seal means 38 seal between the ball 22, and the body end closure 18 when the ball 22 is in its closed position shown in FIG. 1. A valve stem 40 may be turned to turn the ball 22 through 90° to bring its flow passage 23 into alignment with flow passages 42 in the end closures 18.

The Embodiment of FIG. 1

In accordance with one embodiment of this invention, the end closure 18 may be formed with an integral welding neck 44, the inner diameter of which forms the flow passage 42. Welded at 46 to the welding neck 44 is the welding neck 48 of an integral welding neck flange 50. The welding neck flanges 18 and 50 are formed from single thick plates of mill-rolled steel so that the metal grain flow lines, which are predominately planar in the steel plate are bent to flow smoothly from the planar flanges 18 and 50, around the fillets 52 at their junctions with the tubular cylindrical welding necks 44 and 48, there extending in an axial direction.

The Method of Manufacturing Weld Neck Flanges

Referring now to FIGS. 2 to 6, the weld neck flanges of this invention are formed from circular workpieces 60 of thick, mill-rolled steel plate, each circular workpiece 60 having a small coaxial hole 62 therethrough. For example, in one size and class, the workpiece 60 may be 16 inches in diameter and 4 inches thick, with a through-hole 62, which is two inches in diameter, from which a flow passageway 5¼ inches in diameter will be formed.

Figure 2:
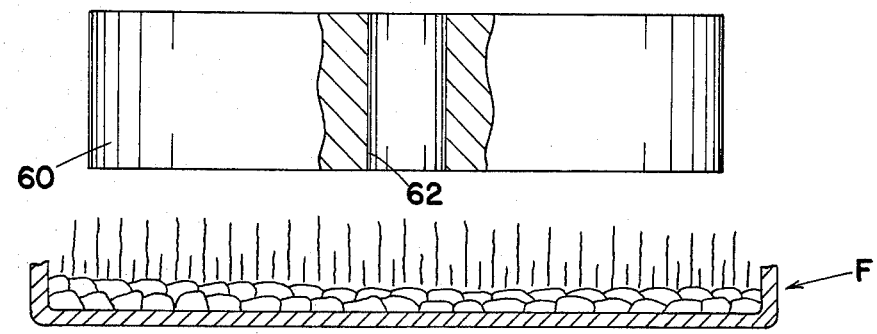
FIGS. 2 to 6 are more or less schematic views showing steps in the method of manufacturing weld neck flanges of this invention.

As shown in FIG. 2, the workpiece 60 is first placed in a furnace F where it is heated to glowing, and then it is moved to an open die support ring 63 (FIG. 3), having an open throat 64 with a radius 65 below the entry end 66 thereof. A blunt nosed, pre-forming punch 67 is located concentrically with the blank 60, and pressed against the blank as indicated by the arrow, to pre-form the blank. The blunt convex nose of the punch 67 depresses the upper surface 68 of the blank 60 into a conical cavity and the opposite surface 70 is deflected outward as shown.

Figure 3:
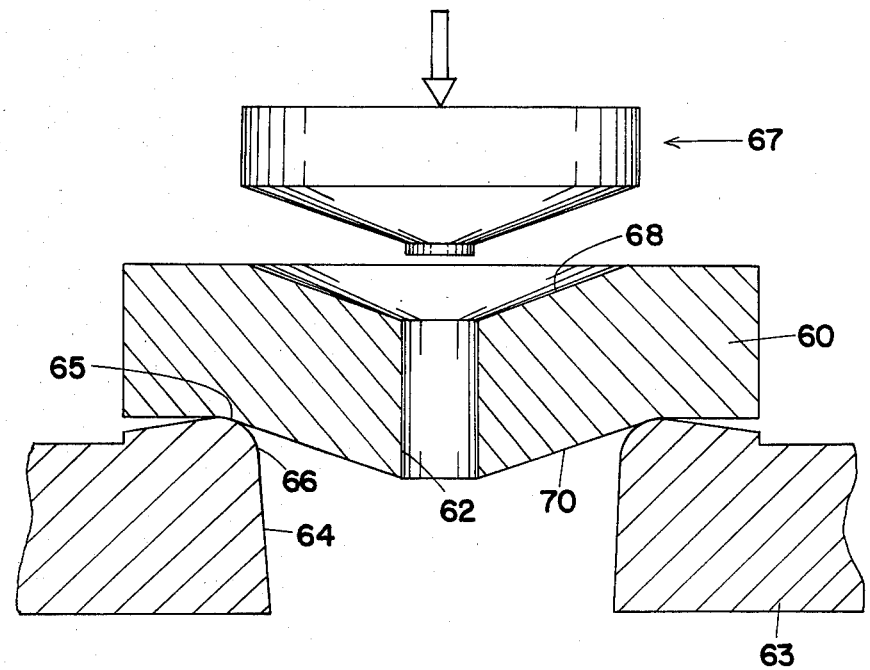
Figure 4:
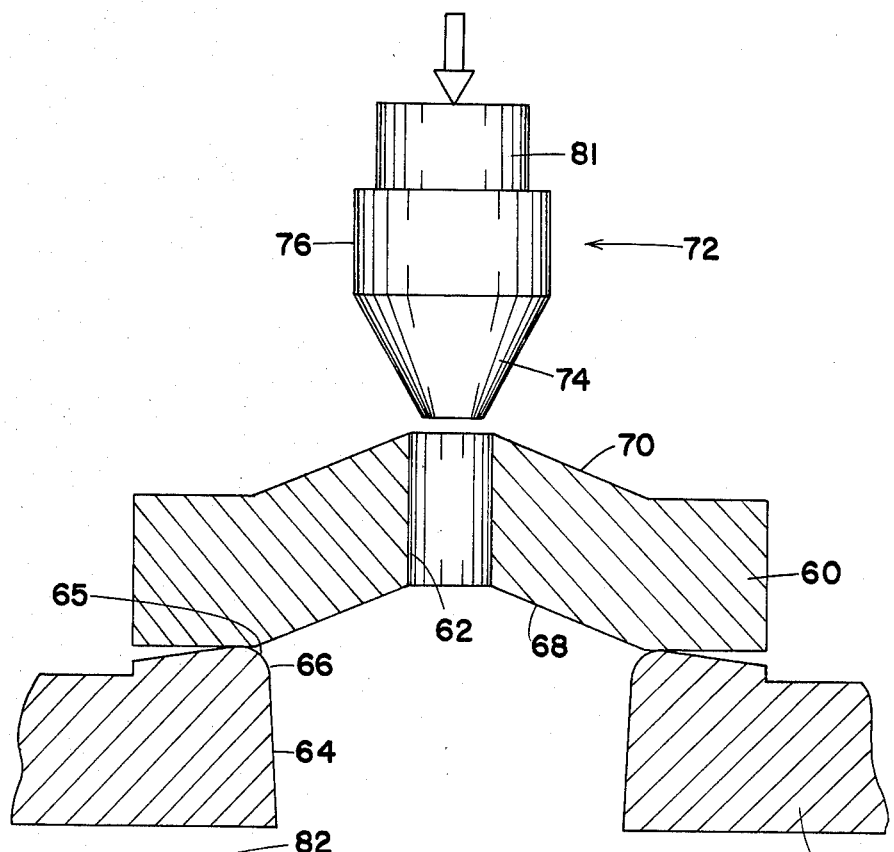

As illustrated in FIG. 4, the blank 60 is then inverted and relocated concentrically on the open, female forming die 63. Now, a male die plug 72 which has a relatively steep or sharp nose cone 74 merging into a finishing cylindrical portion 76 having an outside diameter approximately equal to the desired hole size of the finished flange, is placed concentrically with the blank 60 on the top of the conical convex surface 70 resulting from the pre-form operation of FIG. 3. The relatively sharp or steep conical or bullet-like entry nose 74 delivers a substantial vertical force vector immediately adjacent to the small through-hole 62 to shear-form the metal there and, move the hot steel from that interior portion downward and outward to produce a welding neck 78, which protrudes from the lower surface 68a of the blank 60. The outer contour of this weld neck 78 will be established by the radius 65 provided at the interior corner 66 of the upper surface of the die ring and by the throat diameter 64 of the die ring 63. A suitable draft angle in the interior throat of the die ring will be provided to ensure easy removal of the part after forming.

Figure 5:
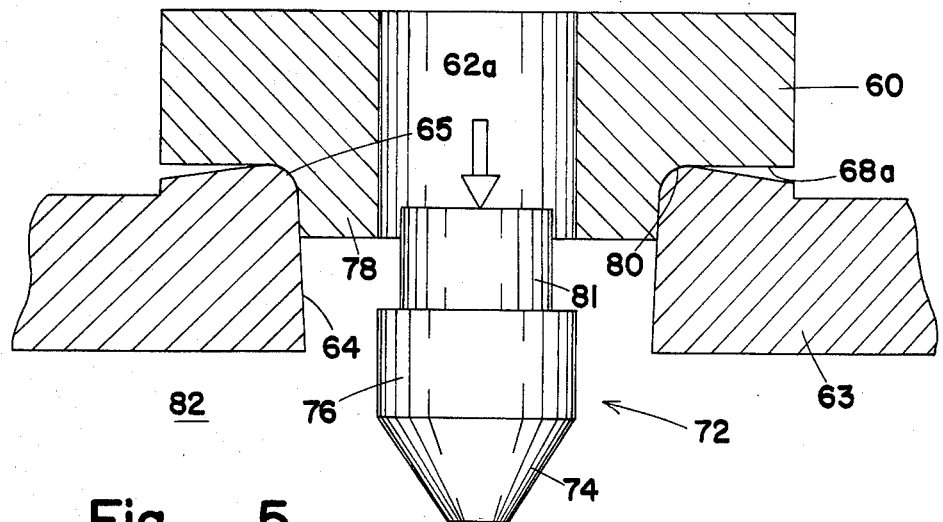

The ram of a hydraulic press indicated by the arrows in FIGS. 4 and 5 will be brought down to force the die plug 72 through the blank 60. A reduced diameter cylindrical pusher bar 81 will be placed on top of the die plug 72 to force it completely through the part 60, enlarging the through-opening 62a and out into a suitable clearance cavity 82, which is provided under the die ring.

The pre-forming step illustrated in FIG. 3 compensates for any tendency of the upper surface of the workpiece 60 to be drawn in a sweeping radius, forming a concavity around the opening 62 as the male shearing die 72 shear-forms the metal outwardly displaced from the through opening 62. However, as an alternative, the step of FIG. 4 and 5 could be repeated with male dies 72 of progressively larger diameter, the work of each die being restricted to a narrow annular area immediately surrounding the gradually enlarged through-opening 62. Such progressive forming could reduce, and perhaps eliminate the amount of pre-forming required in accordance with FIG. 3.

Figure 6:
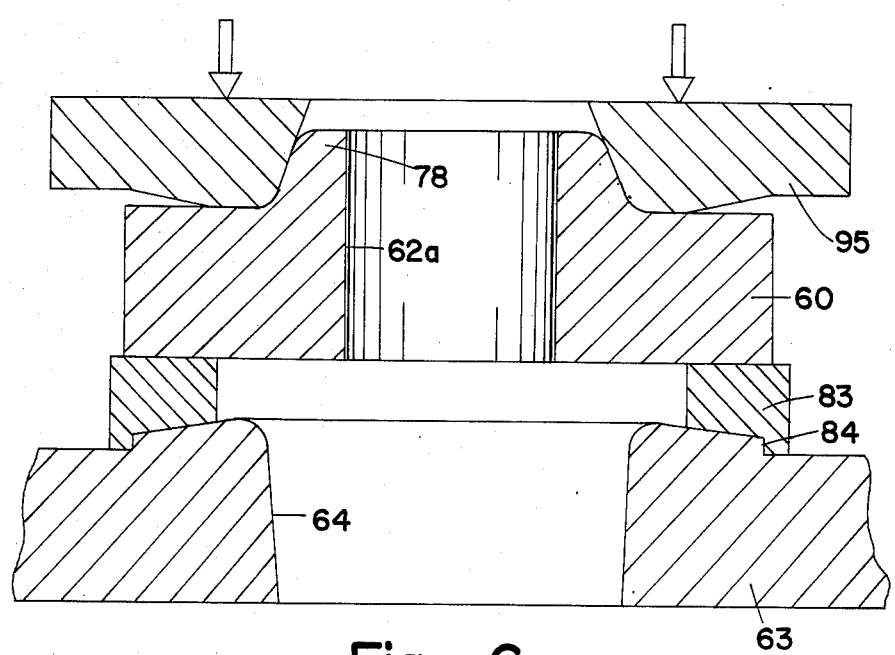

Another approach is illustrated in FIG. 6 wherein after the workpiece 60 is formed in accordance with FIGS. 4 and 5 it is inverted and supported around its outer edges on a larger annular die 83 interlocked at 84 on the open die 63. Then a large annular ring 95 is brought down on the workpiece 60 closely around the weld neck 78 to force the flange 60 into planar configuration as required.

It should be noted that the hot forming method of this invention may be distinguished from that described in our U.S. Pat. No. 4,339,112 wherein a blunt nosed punch is driven against the metal around the central opening of a workpiece, which in turn, is supported on a die ring with a relatively large inside diameter at its upper face. This results in a hot forming action similar to deep-drawing in which the predominant action is to pull the inner portion of the blank down into the die ring opening. Such an action permits a longer neck to be drawn down, mainly by bending, stretching and thinning of the metal over substantially all of the central portion of the part. This action, however, causes a large sweeping radius to form at the upper surface of the blank surrounding the through-hole. This can be adapted to advantage in a closure flange for valves of larger sizes, as described in the aforesaid U.S. Patent, but however, in small valve sizes of, say 6 inches to 12 inches, the existence of such a large radius in a closure flange cannot be tolerated. Moreover, for pipe flanges, wherein the portion of the flange on the outer face (opposite the welding neck) and next to the through-passage is used to accommodate a sealing gasket, no radius at all can be tolerated. Hence, the method of this invention provides a new forming mode, in which just the material immediately adjacent the small hole in the blank is shear-formed, and displaced downward and outward so as to create a welding neck, without producing a large radius around the opening on the opposite face.

The method of the present invention also turns the metal grain flow lines which are predominently planar in the steel plate blank and bends the inner portion of those flow lines smoothly around the fillet at the junction between the flange and the welding neck and directs the flow lines in an axial direction so that they are best disposed to resist working stresses.

Figures 7, 8:
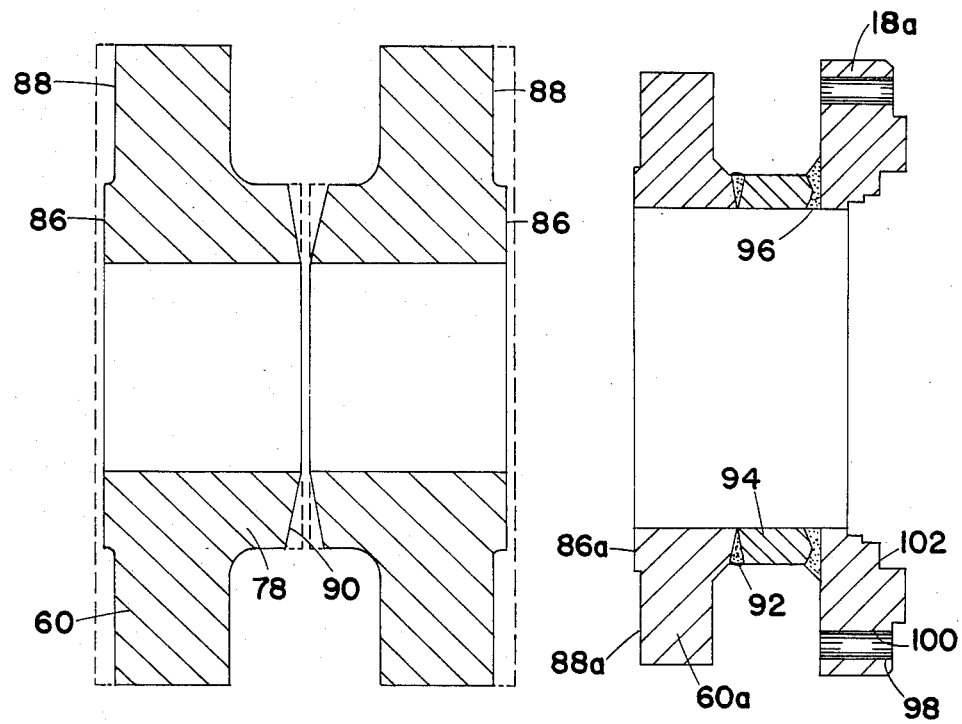
FIGS. 7 and 8 show alternate embodiments of the weld neck flanges.

Referring now to FIG. 7 when the workpiece 60 has been formed in accordance with a method just described, it is removed from the die 64 and allowed to cool. Then, it may be machined at its outer face to form a gasket sealing face 86 and a bolting face 88. In addition, the annular face 90 of the weld neck may be machined as shown to facilitate welding, and bolt holes (not shown) are drilled in the flange 88. In the embodiment of FIG. 1 two weld neck flanges so formed may be positioned face to face as shown in FIG. 7 and a weldment 46 (FIG. 1) is deposited in the Vee groove formed between them to form a unitary valve end closure with hub and piping flange.

Other Embodiments

In FIG. 8, a weld neck flange 60a so formed and machined with sealing and bolting faces 86a and 88a is welded at 92 to a cylindrical hub 94, which was previously welded at 96 to a valve end closure 18a. After welding on the hub 94, the end closure is machined and drilled 98 and 100 to accommodate and attach the valve body band 12 (FIG. 1) and machined at 102 to accommodate the sealing means 38.

In addition, as shown in FIG. 1, a weld neck flange 60b so formed and machined may be welded at 104 directly to a length of steel tubing 106 for fabrication of piping.

While this invention has been described in conjunction with preferred embodiments thereof, it is obvious that other modifications and changes may be made by those skilled in the art to which it pertains without departing from the spirit and scope of this invention, as defined by the claims appended hereto.

What is claimed as invention:

1. The method of forming a weld neck flange comprising the steps of:
    forming a small, generally coaxial circular opening in a generally circular workpiece of thick mill-rolled steel plate material;
    heating said workpiece to glowing;
    placing said workpiece, with one flat annular surface up, on an open female die;
    said female die having a top annular support surface and a generally cylindrical cavity;
    then, pressing a blunt convex circular member against the top surface of said workpiece while supported on said annular support surface so that said top surface of the workpiece is formed concave and the opposite surface is formed convex;
    inverting said workpiece so that said convex opposite surface is up;
    forcing through said heated workpiece a male die having an entry nose that enters freely through said circular opening and a profile gradually increasing in diameter to engage around the edges thereof and shear-form the steel closely surrounding said opening downward below the bottom surface of said workpiece;
    said profile of said male merging with a trailing cylindrical portion thereof of substantially the internal diameter to be formed.

2. The method of forming a weld neck flange defined by claim 1 including the additional steps of:
    again inverting said workpiece after shear-forming and positioning same concentrically on a large annular support; and
    applying an annular press under force downward against said workpiece closely around the shear-formed opening to force said workpiece around said opening into planar configuration.

* * * * *